(12) United States Patent
Hennessy

(10) Patent No.: US 7,159,251 B2
(45) Date of Patent: Jan. 9, 2007

(54) WATER SAVER FLUSH SYSTEM

(75) Inventor: Philip Hennessy, 46-9 Rose Street, R.R. #1, Frankford, Ontario (CA) K0K 2C0

(73) Assignee: Philip Hennessy (CA)

( * ) Notice: Subject to any disclaimer, the term of this patent is extended or adjusted under 35 U.S.C. 154(b) by 271 days.

(21) Appl. No.: 10/897,220

(22) Filed: Jul. 22, 2004

(65) Prior Publication Data

US 2006/0015993 A1   Jan. 26, 2006

(51) Int. Cl.
*E03D 1/06* (2006.01)

(52) U.S. Cl. .............................................. 4/328; 4/324

(58) Field of Classification Search ............ 4/324–325, 4/328, 354, 362, 424, 428
See application file for complete search history.

(56) References Cited

U.S. PATENT DOCUMENTS

| 380,854 | A | | 4/1888 | Boyle |
|---|---|---|---|---|
| 530,306 | A | * | 12/1894 | Harvey ........................... 4/328 |
| 534,689 | A | | 2/1895 | Hamilton |
| 3,719,958 | A | | 3/1973 | Wilheim |
| 3,988,785 | A | | 11/1976 | Schoepe et al. |
| 4,115,883 | A | | 9/1978 | Dauvergne |
| 5,487,193 | A | | 1/1996 | Hennessy |
| 5,515,556 | A | | 5/1996 | Johnson |
| 5,803,114 | A | | 9/1998 | Johnson |
| 5,964,652 | A | * | 10/1999 | Melzner et al. ............. 451/285 |
| 6,401,270 | B1 | | 6/2002 | Moore |

FOREIGN PATENT DOCUMENTS

| WO | WO 96/10118 | 4/1996 |
|---|---|---|
| WO | WO 99/20851 | 4/1999 |

* cited by examiner

*Primary Examiner*—Charles E. Phillips
(74) *Attorney, Agent, or Firm*—Leon D. Rosen

(57) ABSTRACT

A water saver toilet that produces a larger water spot (122) in the toilet bowl (12) and a better flushing, and that enables partial and full flushing. A trapway (14) that extends from the toilet bowl outlet to a drain (16), has upper and lower traps (30, 32) and a trapway passage (34) that extends between and into the traps. The lower trap is constructed to be sealed by water therein prior to each flushing, and a pressured air source (98) applies pressured air to the trapway prior to a flushing. The pressured air in the trapway pushes some upper trap water into the toilet bowl to increase the water spot therein. A first container (40) lies in the water tank, and the water therein can be flushed down from the first container though a coupling region (80) and though a flush valve (24), for a partial flushing. A full flushing is achieved by opening a second valve (62) to pass water lying in the tank around and above the first container, and through the coupling region and the flush valve.

15 Claims, 3 Drawing Sheets

WATER SAVER FLUSH SYSTEM

BACKGROUND OF THE INVENTION

A typical toilet includes a tank filled with water and having a flush valve at its bottom. When a control handle is manually operated, water in the tank passes into a toilet bowl that may contain waste, to flush the waste through an upper trap and through a passage leading to a drain pipe. The water-filled upper trap prevents sewer gas from passing into the washroom. A water saver toilet typically reduces the amount of water passed into the bowl in each flushing, and uses a smaller toilet bowl to enable the contents of the bowl to be flushed out using less water. This usually results in a smaller "water spot," which is the top of the pool of water in the bowl. Many people are uncomfortable with a small water spot in a shallow pool of water in the bowl, because waste may stack up above the water spot. A water saver toilet that provided a larger water spot and deeper pool of water in the bowl, and which enhanced a flushing, would be of value.

Flushing water can be saved by allowing the user to choose a partial flush when only liquid waste lies in the toilet bowl, and to choose a full flush when solid waste lie in the bowl. It would be desirable if such dual flush toilet used only a single flush valve to minimize the possibility of a leaking flush valve. Also, any less-than-vigorous flush should occur only during the partial flush when only liquid waste is being flushed, while a vigorous flush with rapidly moving flush water should occur during a full flush when solid waste is to be removed from the bowl.

SUMMARY OF THE INVENTION

In accordance with one embodiment of the invention, a water saver toilet is provided that has a larger water spot in the toilet bowl and that provides a better flushing whether in a partial or full flush mode of operation. The toilet has a trapway leading from the toilet bowl to the drain, wherein the trapway includes both upper and lower traps and a trapway passage between them. The lower trap is constructed to hold sufficient water to close the lower trap prior to each flushing. A source of pressured air is coupled to the trapway passage to pressurize it between flushings. The air pressure in the trapway pushes some upper trap water into the toilet bowl to raise the water level therein and create a larger water spot therein. The pressured air is obtained from a first container lying in the toilet tank and having closed top and side walls and an opening in its bottom. Water in the first container is emptied during a flushing, and the first container then fills with air. As water refills the first container though its bottom opening after a flushing, the air in the first container is compressed. This pressured air is carried though a conduit to the trapway passage to pressurize it.

For a partial flushing, a flush handle is operated to open a flush valve that passes water in the first container through a coupling region and through the flush valve, to the toilet bowl. For a full flushing, the handle is operated to open a second valve that passes water that lies in the water tank and above the first container, into the coupling region to pass though the same flush valve.

The novel features of the invention are set forth with particularity in the appended claims. The invention will be best understood from the following description when read in conjunction with the accompanying drawings.

DESCRIPTION OF THE PREFERRED EMBODIMENT

Figure 1:
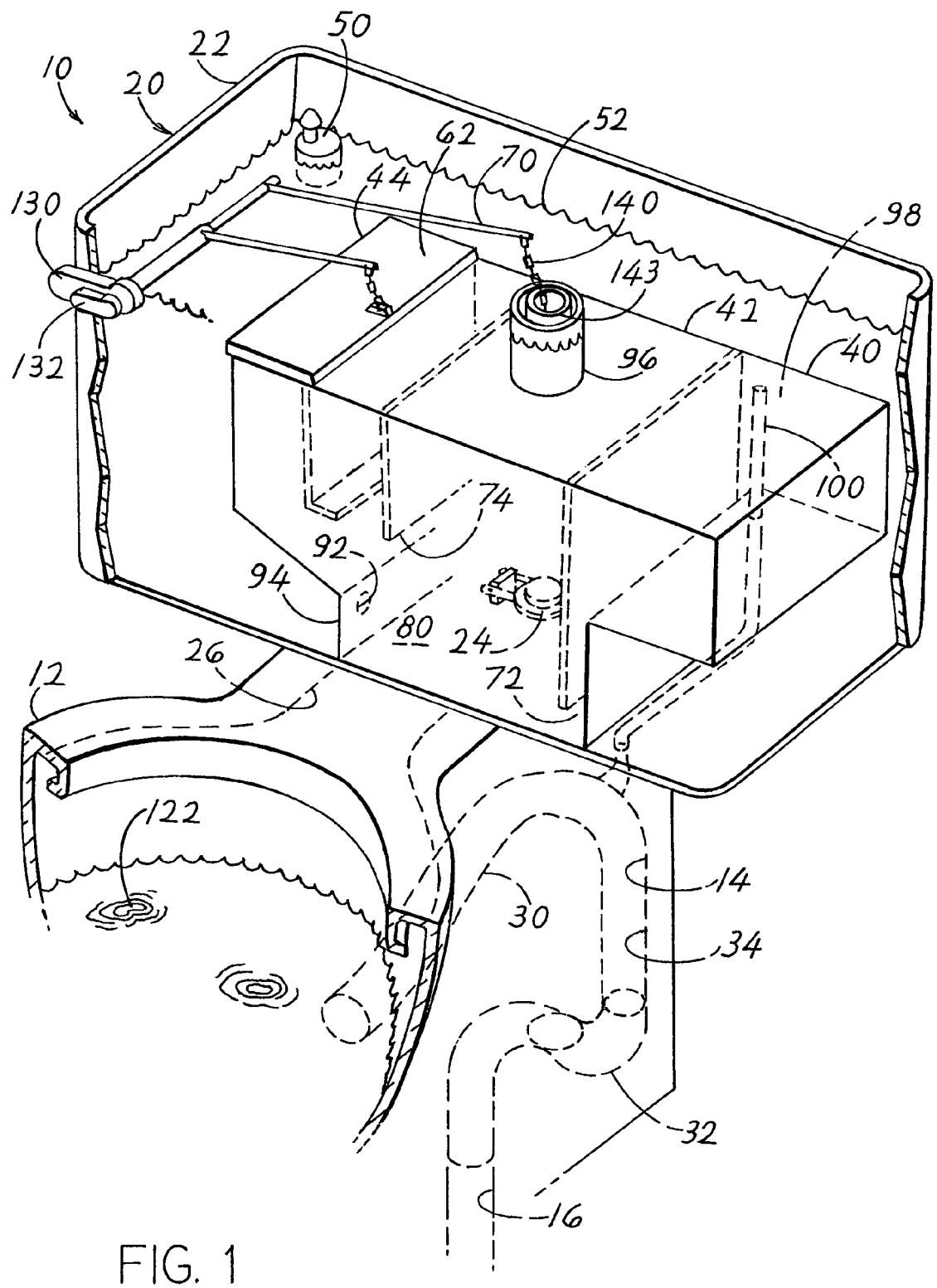
FIG. 1 is a partially sectional isometric view of a toilet constructed in accordance with the present invention.

FIG. 1 shows a toilet 10 of the present invention, which includes a pottery section comprising a toilet bowl 12 and a trapway 14 that leads from the toilet bowl to a drain 16. A water source 20 includes a water tank 22 and a flush valve 24 that discharges water lying in the tank. The discharged water flows through a water tunnel 26 and through openings at the top of the bowl, and into the toilet bowl during a flushing. The trapway 14 includes the usual upper trap 30 that prevents sewer gas from passing into the washroom. The trapway also includes a lower trap 32 and a trapway passage 34. The water source 20 includes first and second containers 40, 42, and a passage or third container 44, that all lie in the tank 22. A refill valve 50 admits water into the tank after each flushing, until the water level in the tank reaches a fill level 52. The refill valve also flows a trickle of water into the tunnel 26 at the end of a flushing to fill the toilet bowl. The top of the container 40 lies more than an inch below the fill level 52 of the tank. The flush valve 24 lies in the bottom of the tank. A second valve 62 in the form of a simple pivotable lid lies at the top of the third tank or passage 44.

Figure 2:
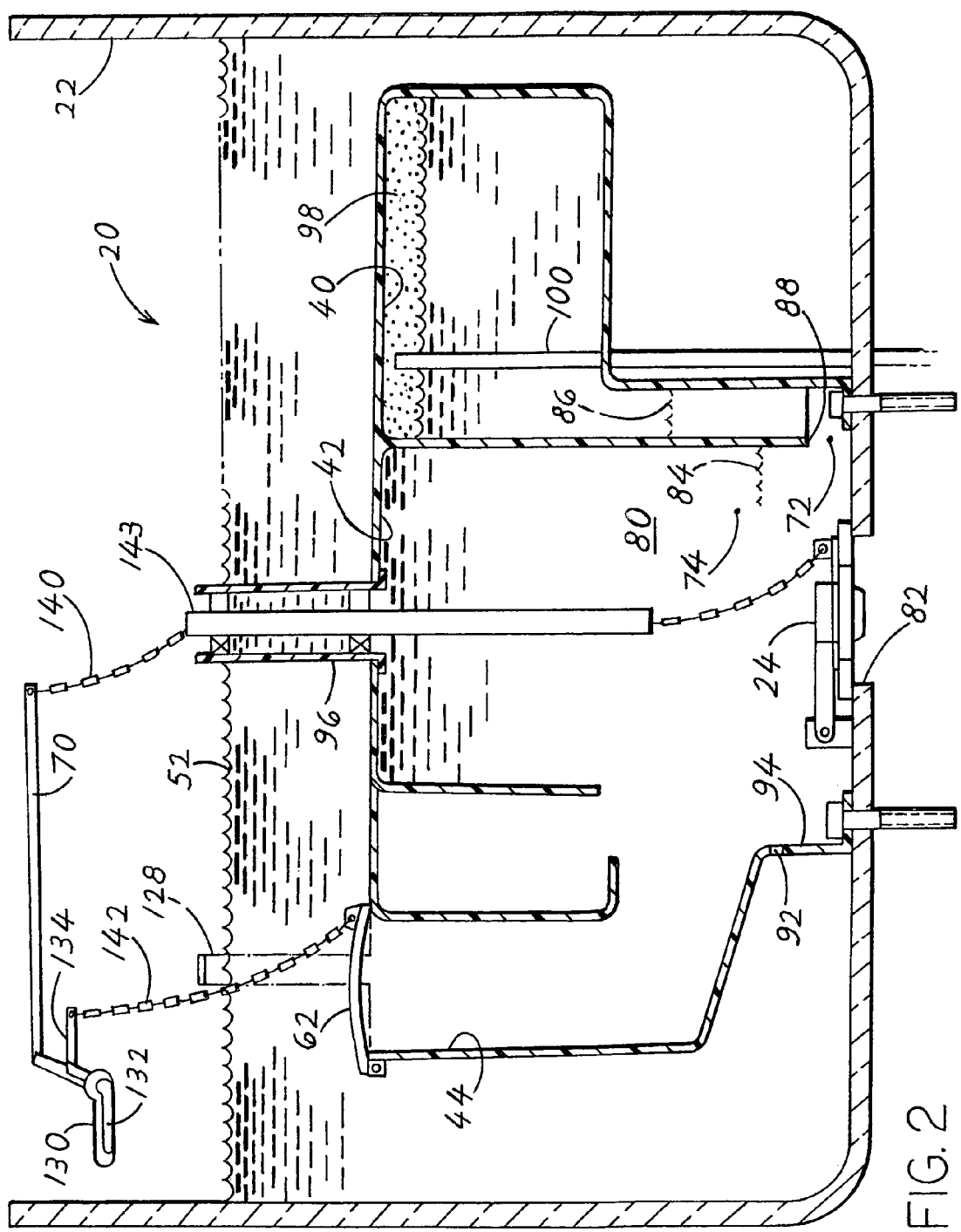
FIG. 2 is a sectional front view of the toilet tank and other parts of the water supply of the toilet of FIG. 1.

As shown in FIG. 2, to flush the toilet (for a partial flushing), a person pivots a handle 130 to raise a beam 70 that operates the flush valve 24. Water moves down out of openings 72, 74 at the bottoms of the first and second containers 40, 42 and through a coupling region 80 to flow out though an opening 82 at the bottom of the tank that has been uncovered by opening the flush valve. Water flows out of the tanks until water level 84 in tank 42 is reached and the flush valve 24 closes. At that time the water level in the first container 40 is at 86. The bottom 88 of the container 40 lies a plurality of millimeters above the tank bottom. The water from the containers moves through the water tunnel (26, FIG. 1) and into the toilet bowl, and raises the level of water in the toilet bowl. The contents of the toilet bowl moves through the upper trap and down through the trapway passage and lower trap to the drain. The water now filling the trapway creates a syphon that pulls out all water and waste in the toilet bowl and carries it to the drain.

Immediately after water has flowed out of the two containers 40, 42, water slowly flows back into the containers to fill them. Such water flows though small holes 92 in the walls 94 of the coupling region and up into the containers 40, 42, 44. The second container 42 has an upper end that is vented through a tube 96 to the space at the top of the tank, above the filled water level. The first tank 40 is vented only though a conduit 100.

Figure 3:
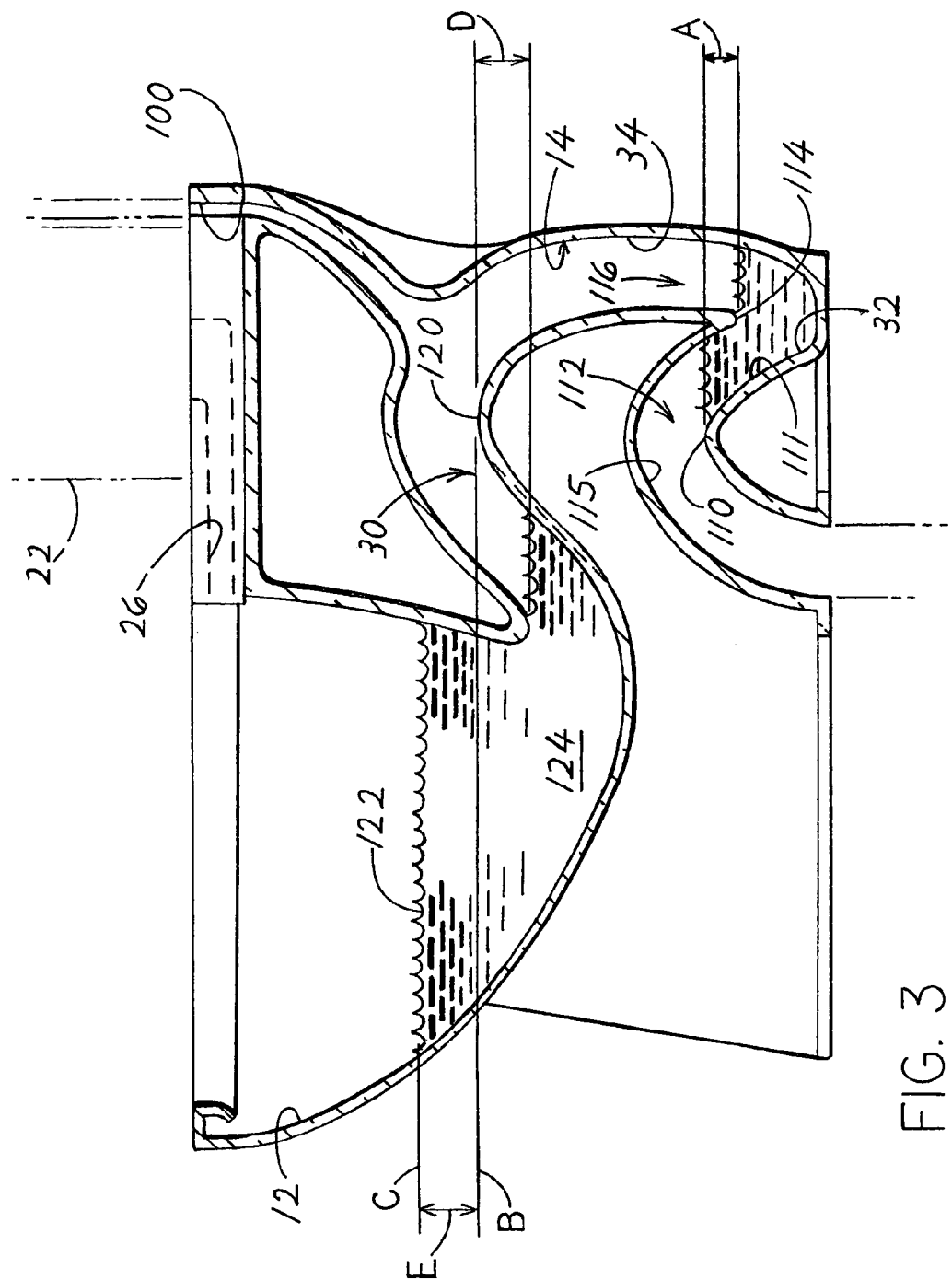
FIG. 3 is a side elevation view, partly in section, of the toilet bowl and trapway of the toilet of FIG. 1.

As the water level rises in the first tank 40, air trapped in an air trapping region 98 at the closed top of the first tank is compressed, and such compressed air moves into the conduit 100. The conduit 100 is connected to the trapway 14 shown in FIG. 3, to flow pressured air therein at the end of a flushing. Late in the next flushing, when water is no longer syphoned out of the toilet bowl, while a trickle of water continues to flow into the toilet bowl to fill it, a trickle of water flows past the upper trap and keeps the lower trap filled. When water stops flowing into the toilet bowl, pressured air remains in the trapway passage 34. The lower trap is constructed, as shown in FIG. 3, so the top point 110 of the lower trap bottom wall 111, which lies in the downstream side 112 of the lower trap, is higher than the bottom point 114 of the upper wall 115 of the lower trap, which lies in the upstream side 116 of the lower trap. The difference distance A is more than one centimeter and is preferable a plurality of centimeters. This construction maintains pressured air in the trapway between flushings. If the air pressure in the trapway exceeds the pressure of a height A of water, such as 4 centimeters of water (which equals 0.06 psi), then the pressured air pushes down water to level 114 and the pressured air passes under the lower trap top bottom point 114 until the air pressure in the trapway is equal to the height A of water.

The presence of pressured air in the trapway between flushings has the effect of raising the level of water in the toilet bowl 12. If there were zero pressure (atmospheric pressure) in the trapway between flushings, then during bowl refill at the end of a flushing, water would flow out of the bowl. The water spot in the bowl would move down until it reached level B at the top point 120 of the lower wall of the upper trap. In a water saver toilet, the bowl may be significantly smaller than previously, and the ability to raise the water level in the bowl is an important advantage. The air pressure in the trapway raises the water level in the bowl to level C. The bowl walls are inclined, especially at the front, which results in a significantly larger water spot 122. Consumers generally want a large water spot 122 because it indicates that more waste will be completely submersed in water in the bowl and possibly emit less odor. The increase E in water spot level is roughly about equal to height A and to height D.

The movement of toilet bowl water from level B to level C has an additional advantage. This additional advantage is that the water 124 in the bowl falls by the distance E just from the drop in air pressure in the trapway 14 as the pressure drops to atmospheric pressure or to a vacuum. Such dropping occurs as water starts filling the bowl, to thereby provide a more vigorous flushing. The pressure of air in the trapway is rapidly lowered during a flushing as the water level in the first container drops. Such lowering of air pressure in the trapway occurs early during a flushing, as the water level in the first container 40 drops, and the first container drains air through conduit 100 out the trapway and may even create a vacuum therein. During a flushing, when the upper trap 30 breaks but is not yet filled by a trickle of water from the refill valve, air passes through the upper trap and through the conduit 100 to refill the top of the container 40 with air.

The water source 20 of FIG. 2 can be operated in a partial flush mode to empty primarily the contents of the first and second containers 40, 42 into the water tunnel, and can be operated in a full flush mode. In a full flush, the second valve formed by the lid 62 is opened, in addition to opening the flush valve 24. When the lid 62 is also opened, water in the third container 44 plus water in the tank 22 that lies above the lid, flows though the third container, or passage, to the coupling region 80 and out through the open flush valve. The greater height of water at 52 that lies above the lid, results in a more vigorous flushing. If the lid 62 does not form a leak-tight seal, this has little effect, because it results in only a slight leakage into the coupling region at the beginning of a flushing, and until the containers 40, 32, 44 are refilled. A leak in the flush valve 24 can cause loss of a large amount of water. It is possible to provide a large third container and empty its contents in a full flushing by opening a valve that admits air rather than additional water, into the third container. For example, if container 44 holds one liter of water, a valve shown at 128 can be opened to admit air into the third container 44 to flush out the entire liter when flush valve 24 is also open.

A variety of manually controlled devices are available to open the flush valve 24, and sometimes also the lid 62. FIG. 2 shows two handles 130, 132 with the first 130 depressed for a partial flush and with both handles 130, 132 depressed for a full flush. The handles 130, 132 connect to beams 70, 134 with outer ends attached to chains 140, 142. Chain 140 extends to a rod 143 to lift it and open the flush valve 24. The other chain 142 extends to the lid 62 to pivot it open. The lid 62 can have a hydrodynamic surface or float that keeps the lid open while water flows past it, until almost all water above the lid 62 has flowed out. One type of flush valve 24 may be the type described in U.S. Pat. No. 3,988,785, which remains open when first opened, until almost all water has been released.

Thus, the invention provides an enhanced water saver toilet. The water spot in the toilet bowl in increased and the depth of water in the bowl is increased by providing a trapway that contains pressured air between flushings. The trapway includes upper and lower traps. The lower trap is constructed so it is closed between flushings, by placing the top location (110) of the lower trap bottom wall, which lies at the downstream side of the lower trap, so it is higher than the bottom location (114) of the lower trap upper wall, which lies at the upstream side of the lower trap, to contain water in the lower trap between flushings. The difference A in height is more than a centimeter and preferable at least two centimeters to significantly raise the level of water in the toilet bowl. The water supply includes a first container that has closed top and side walls and an opening in its bottom, so when the first container fills with water, air at the top of the container is pressurized and carried though a conduit to the trapway. The water supply can include a vented (though a vented second container) coupling region that connects the first container to a flush valve. Additional water can be supplied by opening a second valve that flows water from a third container, plus any water in the tank above the second valve, to the coupling region to flow out though the flush valve.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A toilet which includes a toilet bowl, a trapway that carries away the contents of the bowl to a drain during a flushing, a tank, and a water supply in said tank that flows water into said bowl in each flushing, wherein said trapway includes upper and lower traps, comprising:

a source of pressured air located in said tank and coupled to said trapway to establish a positive air pressure, that is above atmospheric pressure, in said trapway prior to a flushing; and wherein;

said lower trap is constructed to remain closed prior to a flushing, to maintain a positive air pressure between said upper and lower traps prior to a flushing.

2. The toilet described in claim 1 wherein: said lower trap of said trapway has and top and bottom lower trap walls and has upstream and downstream lower trap sides, and a top point of said lower wall at said downstream side lies higher than a bottom point of said top wall, at said upstream side.

3. The toilet described in claim 2 wherein: said top point (110) lies at least two centimeters higher than said bottom point (114).

4. The toilet described in claim 1 wherein: said water supply and said source of pressured air includes a first container that releases water at each flushing to flow to the toilet bowl, and a refill valve that flows water into said first container after each flushing, said first container having an air trapping region that traps air and pressurizes the air as said first container refills with water; and
  a conduit that connects said air trapping region to said trapway, to pressurize said trapway prior to each flushing.

5. The toilet described in claim 4 wherein:
said tank has a tank bottom, and including a flush valve lying at said tank bottom, said first container lying in said toilet tank and having an open first container bottom that lies a plurality of millimeters above said tank bottom, and including;
a second container that lies in said toilet tank beside said first container, with said second container having an open second container bottom that lies above said tank bottom and with said second container having a vented upper end;
a coupling region that lies below said first and second containers and that is open to said bottoms of said first and second containers and that is open to said flush valve device, so water from said first and second containers and from said coupling region are released through said flush valve when said flush valve is opened.

6. The toilet described in claim 5, including:
a passage that leads from water in said tank that lies outside said first and second containers, to said coupling region, and a second valve that opens and closes said passage.

7. A toilet that includes a toilet bowl, a trapway that carries away the contents of the bowl during a flushing, a water tank, a flush valve that is manually operable to release water from the tank to the toilet bowl, and a refill valve that supplies water to the tank after each flushing, wherein said trapway includes upper and lower water traps and a trapway passage extending between and into said traps, comprising;
  a first container lying in said tank, said first container having closed top and side walls and having a bottom with an opening for passing water out of the container during a flushing and for receiving water during a refilling of said tank; and
  a conduit that connects a top portion of said first container to said trapway, to carry pressured air to a location between said upper and lower traps;
  said lower trap of said trapway having a water barrier that keeps the lower trap closed between flushings, whereby the first container applies pressured air to said trapway after each flushing and said lower trap contains the pressured air prior to a next flushing.

8. The toilet described in claim 7 wherein:
said lower trap has upstream and downstream sides, and a bottom wall of said downstream side has a topmost location that lies more than one centimeter higher than a bottommost location of a top wall of said upstream side.

9. The toilet described in claim 7 including:
walls forming a bottom coupling region that connects said first container opening to said flush valve;
said tank is filled with water that lies in a tank outer region around said first container and at a predetermined level before a flushing; and including
walls forming a water passage that extends between said tank outer region and said bottom coupling region;
a second valve that initially closes said water passage but that can be opened to flow water from said tank outer region to said bottom coupling region;
a manually operable control that can be operated in a first mode to open only said flush valve for a partial flush, or to open said flush valve and said second valve for a full flush.

10. A toilet that includes a toilet bowl, a trapway that carries away the contents of the bowl during a flushing, a water tank, a flush valve that is manually operable to release water to the toilet bowl, and a refill valve that refills the tank to a refill level after each flushing, comprising:
  a first container lying in said tank and having a bottom container region in communication with said flush valve but isolated from a tank outer region that lies outside said first container, so said first container releases water at a rapid rate when said flush valve is opened but said first container receives water from said tank outer region at a slow rate when the tank refills after a flushing;
  another container that has first and second ends, said second end opening to said bottom container region;
  a second valve that can be operated to open said first end of said another container to allow water to flow out of said third container second end;
  a manual control that is operable in a first manner to open said flush valve, and that is operable in a second manner to open said second valve, whereby to release water in said container for a partial flushing or also release water in said tank that lies above said passage first end for a full flushing.

11. The toilet described in claim 10 wherein:
said tank has a bottom with a tank opening that is sealed by said flush valve, and said first container includes a second container section with an opening that opens to said bottom container region;
said second container section has an upper end lying a plurality of centimeters below said refill level, and including a vent tube that extends from said second container section upper end to above said refill level.

12. The toilet described in claim 11 wherein:
said manual control includes a rod that extends through said vent tube and that has a lower end coupled to said flush valve.

13. The toilet described in claim 10 wherein:
said manual control includes at least one pivotal handle rod and at least one beam that extends from said rod:
a first coupling that extends from said at least one beam to said flush valve to open it and a second coupling that extends from said at least one beam device to said second valve to open it.

14. The toilet described in claim 10 wherein:
said first end of said third container lies below said refill level and said second valve couples said third container first end to water in said tank.

15. The toilet described in claim 10 wherein:
said second valve couples said third container to air that lies above said refill level.

* * * * *